(12) United States Patent
Shintani et al.

(10) Patent No.: US 10,868,624 B2
(45) Date of Patent: Dec. 15, 2020

(54) BACKWARD COMPATIBLE MECHANISM TO PROVIDE CABLE TYPE SIGNALING IN HDMI

(71) Applicant: Sony Corporation, Tokyo (JP)

(72) Inventors: Peter Shintani, San Diego, CA (US); Robert Noel Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 15/729,956

(22) Filed: Oct. 11, 2017

(65) Prior Publication Data

US 2019/0013889 A1 Jan. 10, 2019

Related U.S. Application Data

(60) Provisional application No. 62/529,690, filed on Jul. 7, 2017.

(51) Int. Cl.
*H04N 21/222* (2011.01)
*H04N 21/2343* (2011.01)
(Continued)

(52) U.S. Cl.
CPC .............. *H04J 3/22* (2013.01); *G02B 6/4416* (2013.01); *G09G 5/12* (2013.01); *H04B 10/2575* (2013.01); *H04N 7/102* (2013.01); *H04N 7/106* (2013.01); *H04N 7/22* (2013.01); *H04N 21/4363* (2013.01); *G09G 2370/047* (2013.01);
(Continued)

(58) Field of Classification Search
None
See application file for complete search history.

(56) References Cited

U.S. PATENT DOCUMENTS 8,294,307 B2  10/2012  Tsai
2008/0155376 A1*  6/2008  Williams .............. H04L 1/0065
   714/760
(Continued)

FOREIGN PATENT DOCUMENTS

CN    103702056 B   1/2017
EP      2190193 A2   5/2010
WO   2016153249 A1   9/2016

OTHER PUBLICATIONS

Prof. Anuradha G., Dr. B. Persis Urbana Ivy, Extending the Features of E-EDID in Common User Interface (CUI), VIT University, International Journal of Scientific & Engineering Research, Jan. 2014, vol. 6, Issue 1, Vellore, India.

*Primary Examiner* — Brian T Pendleton
*Assistant Examiner* — Jean D Saint Cyr
(74) *Attorney, Agent, or Firm* — John L. Rogitz

(57) ABSTRACT

An active optical cable (AOC) signals to a source that it needs power above a standard voltage, e.g., above five volts, by sending a signal such as a voltage step from one non-zero voltage to a second non-zero voltage or other voltage pattern on a hot plug detect (HPD) pin of a display data channel (DDC). While a legacy source device may not be able to detect this and consequently will operate as usual, a source device programmed according to present principles detects the request for more power represented by the voltage pattern established by the AOC, and in response increases the power (voltage and/or current) on DDC 5V line to the requested level, e.g., 10V at 500 mA.

16 Claims, 6 Drawing Sheets

(51) Int. Cl.
- *H04N 21/235* (2011.01)
- *H04N 21/2383* (2011.01)
- *H04N 21/239* (2011.01)
- *H04N 21/426* (2011.01)
- *H04J 3/22* (2006.01)
- *H04B 10/2575* (2013.01)
- *H04N 7/22* (2006.01)
- *H04N 7/10* (2006.01)
- *G02B 6/44* (2006.01)
- *H04N 21/4363* (2011.01)
- *G09G 5/12* (2006.01)
- *H04N 21/41* (2011.01)

(52) U.S. Cl.
CPC ..... *G09G 2370/12* (2013.01); *G09G 2370/18* (2013.01); *H04N 21/4122* (2013.01); *H04N 21/43635* (2013.01)

(56) References Cited

U.S. PATENT DOCUMENTS

| | | | |
|---|---|---|---|
| 2010/0128178 A1* | 5/2010 | Yun | H04N 5/4403 348/558 |
| 2010/0135429 A1* | 6/2010 | Nakajima | H04N 5/63 375/295 |
| 2010/0303424 A1 | 12/2010 | Furuyama | |
| 2013/0038793 A1* | 2/2013 | Yoshida | H04N 21/44231 348/552 |
| 2014/0327833 A1* | 11/2014 | Kabuto | H04N 5/63 348/730 |
| 2015/0326919 A1* | 11/2015 | Kitano | H04N 21/43635 725/80 |
| 2016/0345040 A1* | 11/2016 | Oh | H04N 21/236 |
| 2017/0055029 A1* | 2/2017 | Kitano | H04N 5/775 |

* cited by examiner

BACKWARD COMPATIBLE MECHANISM TO PROVIDE CABLE TYPE SIGNALING IN HDMI

FIELD

The present application relates to technically inventive, non-routine solutions that are necessarily rooted in computer technology and that produce concrete technical improvements.

BACKGROUND

The High Definition Multimedia Interface (HDMI) standard defines various types of cables for connecting sources, such as set-top boxes, to sinks, such as TV displays. Two types of cables are active and converter cables. A converter cable has a transmitter at one end and a receiver at the other end. One type of converter cable is an Active Optical Cable (AOC). Both active and converter cable types may or may not require external power sources to operate.

In an AOC, HDMI electrical signals are converted to optical signals by an electrical-to-optical converter receiving signals from the source, sent through an optical line, and then the optical signals are converted to HDMI electrical signals by an optical-to-electrical converter that supplies the signals by an sink. This conversion requires power. However, an external power supply requires the inconvenience of an AC adapter plus an extra power cord. As understood herein, this can be avoided if the source or sink device can supply power to the AOC.

SUMMARY

Present principles understand that the source device can provide power to the AOC typically at 50 mA and 5V on the display data channel (DDC) +5V line of the communication bus, which may be connected to a high plug detect (HPD) pin of the bus connector. A DDC +5V signal initially sent by the source device is looped back in the sink device to the source via the HPD pin, such that when the signal from the HPD pin is detected by the source, it begins to read data related to the sink and then provide a video signal appropriate for the sink. While this power incidentally may be sufficient to also operate an AOC under some conditions, present principles recognize that as the HDMI interface speed increases and/or cable length increases, the voltage and/or power level must be increased. In other words, the amount of power needed by an AOC can depend on the design of the signal converters and optical modules of the AOC, and perhaps as well on dynamic factors such as data rate and signal-to-noise ratio (SNR) as determined from signal quality data on the sink side. As further understood herein, however, a source device may be constrained to supply no more than +5V at 50 mA due to compliance tests and also backward compatibility issues with legacy sink devices and cables.

With the above in mind, techniques are described for an AOC to signal to a source device that it is requesting additional power. Generally, an AOC cable is programmed in firmware and/or software to modify the HPD signal to request more power of the source device. For example, the AOC may do this by inserting a pattern such as a voltage step in the HPD signal. Thus, instead of rising to the HPD signal threshold level immediately, the AOC can first raise voltage from zero to a level under five volts for a short period such as 25 milliseconds, then increase the HPD voltage to the full five volts. While a legacy source device may not be able to detect this and consequently will operate as usual, a source programmed according to present principles detects the request for more power represented by the voltage pattern established by the AOC, and in response increases the power (voltage and/or current) on DDC 5V line to the requested level, e.g., 10V at 500 mA.

Accordingly, an active optical cable (AOC) assembly includes at least one electrical-to-optical (EO) converter configured for receiving video signals from a source and converting the video signals to optical signals. The AOC assembly also includes at least one optical-to-electrical (OE) converter configured to receive the optical signals and convert the optical signals to the video signals to provide the video signals to a sink. At least one optical transmission line is between the EO converter and OE converter. The AOC assembly further includes instructions in firmware and/or software to request power from the source by changing voltage on a display data channel (DDC) from a first non-zero voltage to a second non-zero voltage.

In some examples, the instructions are executable by at least one of the converters.

In non-limiting implementations, the instructions may be executable to request power from the source by changing voltage associated with a hot plug detect (HPD) pin of the DDC. The instructions may be executable to request power from the source by inserting a pattern in the voltage on the DDC. In some embodiments, the pattern can include at least one voltage step in a signal associated with a hot plug detect (HPD) element of the DDC.

Some embodiments may include instructions that are executable to request power from the source by raising the voltage on the DDC from zero to a voltage less than the second non-zero voltage for a time period, then at the elapse of the time period increase the voltage to the second non-zero voltage.

The second non-zero voltage can be, e.g., five volts.

In another aspect, a source of video includes at least one processor configured to provide video signals for presentation thereof on a sink, and at least one computer storage comprising instructions executable by the processor to receive at least one voltage from an active optical cable (AOC) assembly. The instructions are executable to, responsive to identifying that the voltage is a first voltage, provide power to the AOC assembly at a first power level. The instructions also are executable to, responsive to identifying that the voltage is a second voltage, provide power to the AOC assembly at a second power level less than the first power level.

In another aspect, a method includes receiving from an active optical cable (AOC) assembly a request for power above a nominal non-zero power. The method also includes responsive to the request, providing to the AOC assembly power above the nominal non-zero power.

The details of the present disclosure, both as to its structure and operation, can be best understood in reference to the accompanying drawings, in which like reference numerals refer to like parts, and in which:

DETAILED DESCRIPTION

Figure 1:
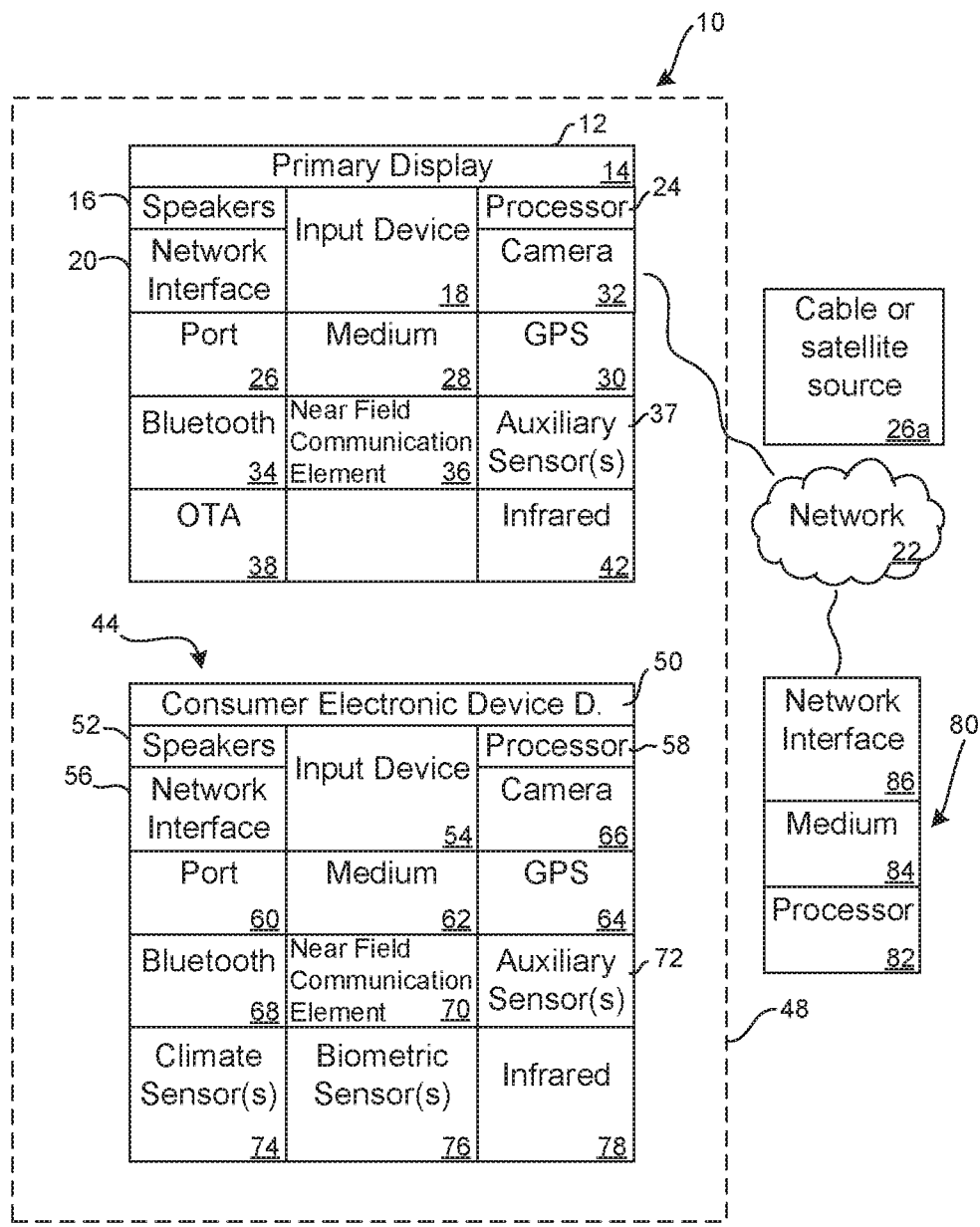
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B. C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. The AVDD 12 is but one example of a "sink", i.e., a device that presents content, typically video, from a "source". The AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver. GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more tuners 37 such as ATSC 1.0 and/or ATSC 3.0 tuner/receivers communicating with the processor 24. A tuner is an example of a "source" of content to be played on the AVDD 12. The AVDD 12 may include sensors 38 such as a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.), one or more climate sensors (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types.

In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The CE device 44 may be other devices that function as sources of content for the AVDD 12, e.g., the CE device 44 may be implemented by a set-top box, a satellite receiver, a disk player, a computer game console, etc. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44. The second CE device 46 may be implemented by a digital video receiver such as a digital TV, mobile telephone, or other device for playing received digital video.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
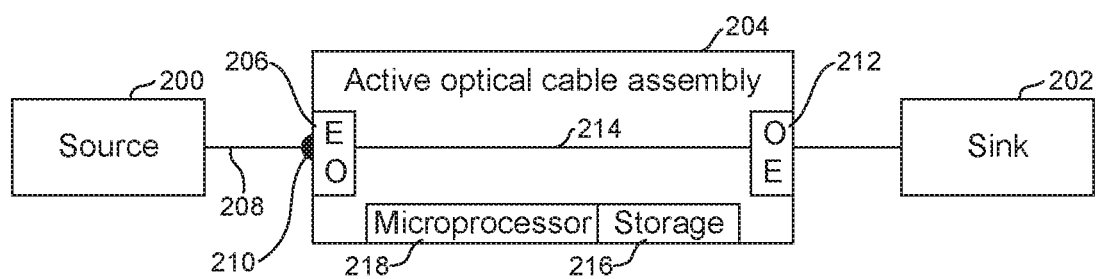
FIG. 2 is a block diagram schematically showing a source connected to a sink by an AOC assembly.

Now referring to FIG. 2, a source 200 such as but not limited to the CE device 44 implementing a source of content in FIG. 1 may send content such as audio-video content to a sink 202 such as but not limited to the AVDD 12 of FIG. 1 via an active optical cable (AOC) assembly 204 that may incorporate appropriate components of any of the devices described herein. In the example shown, the AOC assembly 204 includes one or more electrical-to-optical (EO) converters 206 configured for receiving video signals over a line 208 such as a display data channel (DDC) line from the source 200, converting the video signals to optical signals. Typically, the DDC line includes plural sub-lines that terminate in respective pins of a connector, including a hot plug detect (HPD) pin schematically shown at 210 in FIG. 2 for illustration purposes.

The AOC assembly can also include one or more optical-to-electrical (OE) converters 212 to receive, via one or more optical transmission lines 214, optical signals from the EO converter 206, converting the optical signals to the video signals to provide the video signals to the sink 202.

As discussed further below, the AOC assembly 204 includes logic in the form of executable instructions in firmware and/or software to request power from the source 200 by changing voltage, e.g., voltage associated with the HPD pin 210 of the DDC 208 from a first non-zero voltage to a second non-zero voltage. The instructions may reside on computer storage 216 in software form or in firmware, and may be executable by one or both of the converters 206, 212. Or, a processor 218 may be provided separate from the converters 206, 212 and communicating therewith for executing the instructions.

Figure 3:
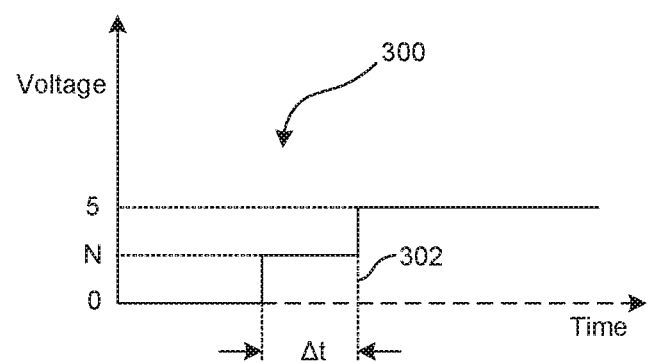
FIG. 3 is a graph of a step voltage request for power in excess of a nominal power.

FIG. 3 is a graph illustrating the above principles. The AOC assembly 204 may request power (typically power in excess of a nominal power delivered at a nominal voltage of, for example, five volts) from the source by inserting a pattern 300 in a voltage signal, such as the voltage on the DDC. The power request may be made upon initial connection of the AOC assembly to the source, which delivers initial power to the AOC assembly. Note that if desired the AOC assembly may include a battery for purposes of providing initial power. In addition, or alternatively, the power request may be made some time after initial connection.

In the non-limiting example shown, the pattern can include at least one voltage step 302 in a signal associated with the HPD pin of the DDC. In the example of FIG. 3, the AOC assembly 204 raises voltage on the DDC from zero to a voltage "N" that is less than a second non-zero voltage (in the example, five volts) for a time period Δt, which may be, for example, a few hundred milliseconds. At the elapse of the time period Δt, the AOC assembly 204 increases the voltage to the second non-zero voltage (e.g., to five volts). Note that while only a single step is shown, multiple steps may be used. e.g., a second step (or more) between the voltage "N" and five volts may be implemented.

Thus, it is to be understood that the above is but one example of a voltage pattern that can be correlated to a request for additional power. Other patterns may be used, e.g., instead of using a step to "N" and then to five volts, additional, smaller steps may be used. Steps may be repeated, e.g., one or more step increases followed by one or more step decreases may be used, in a recurring pattern if desired.

Present principles understand that care must be taken when adding new signaling to comply with various constraints, including regulatory emissions compliance, co-existence with other signaling that shares a common ground return, co-existence with wireless services to avoid fundamentals and harmonics that can interfere with wireless transmission, and co-existence with other functions within the sink. Preferably, AOC signaling for more power should avoid audio frequencies (to avoid human-perceptible buzzes and whistles) and resonances that may cause visual artifacts. Accordingly, in some examples a low frequency is used such as a change in the DC voltage level, and preferably only immediately after a first connection for a session, e.g., one second or less, during which the source can avoid normal DDC and other signaling.

Figure 4:
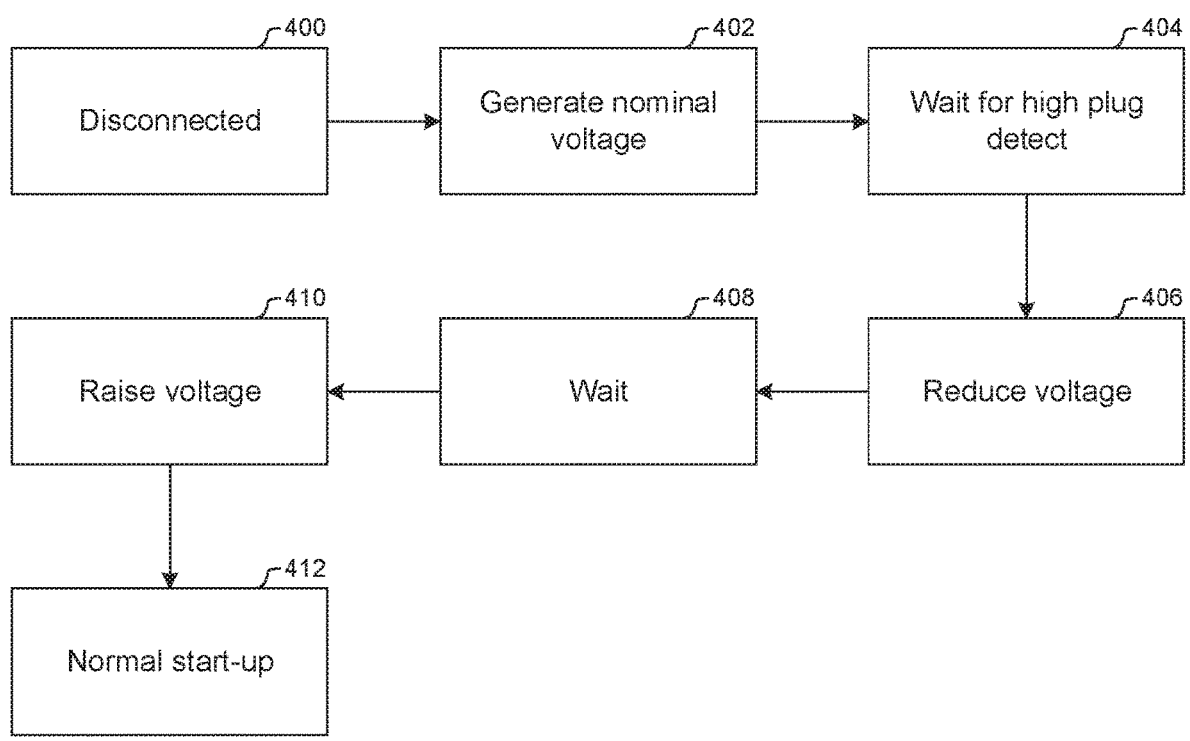
FIGS. 4-6 are flow charts of example logic consistent with present principles.

FIG. 4 illustrates example logic that may be implemented by the source 200, it being understood that in some embodiments the logic of FIG. 4 may be dispensed with. Starting in disconnected state at block 400, the source generates a nominal voltage such as +5V at block 402 on, e.g., the DDC. The source waits for a response on, e.g., the HPD component of the DDC at block 404 for, e.g., a half second.

Moving to block 406, the source may if desired reduce voltage at block 406 to a non-zero voltage, e.g., to 3.3V±10%, ignoring any signaling on the HPD line that may be instigated by the sink, for instance, for purposes of high definition content protection (HDCP). The source holds voltage at the reduced level at block 408 for, e.g., 0.5±10% sec, and then raises voltage back up to the nominal voltage at block 410.

The source may if necessary wait for a HPD signal, but in any case, at block 412 the source performs normal start-up routines including reading extended display identification data (EDID) from the sink, starting high speed signaling, etc. In any case, the voltage changes at 402-410 can indicate to a compliant AOC assembly that the source is capable of supplying power in excess of the nominal power.

Figure 5:
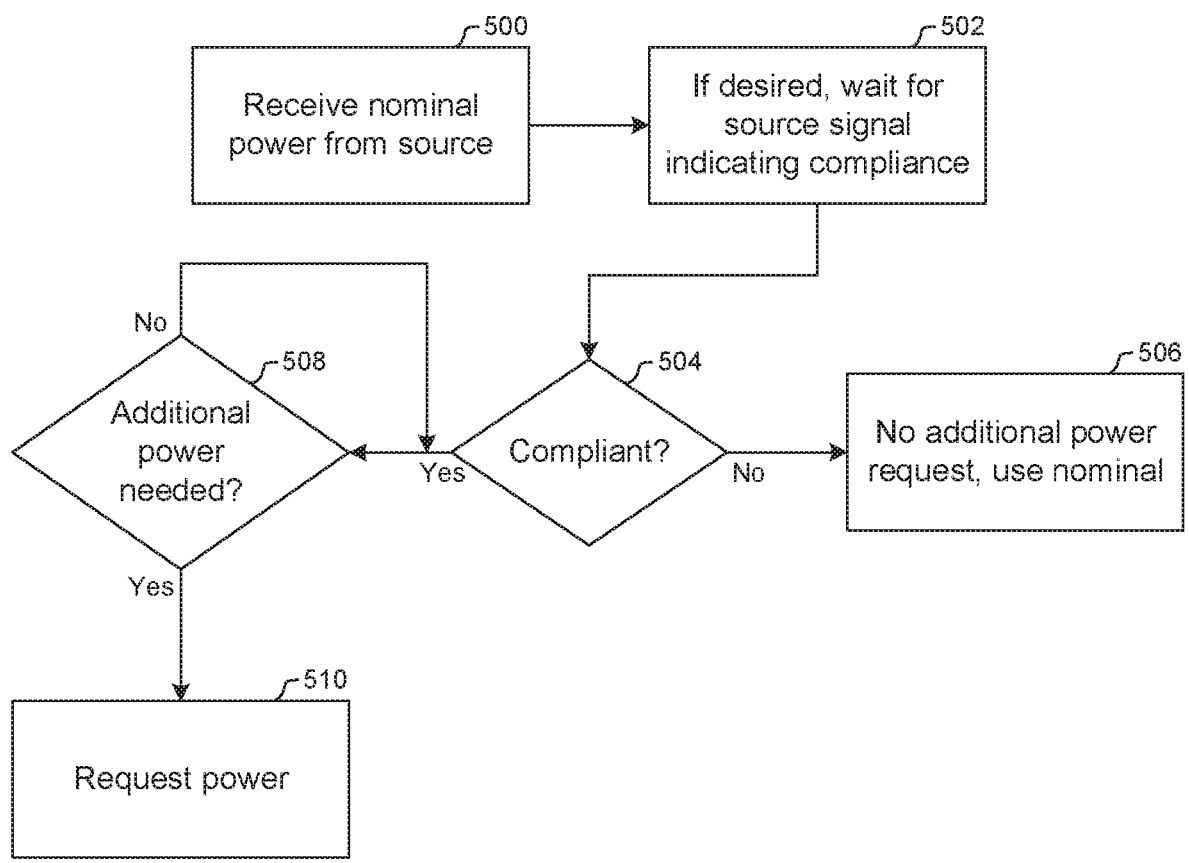

FIG. 5 illustrates example logic that may be implemented by the AOC assembly. At block 500, upon connection with the source 200, the AOC assembly 204 receives nominal power typically at a nominal voltage and current, e.g., +5V. If desired, the AOC assembly may wait for the above-described signaling at block 502 from the source, when implemented. For example, the AOC assembly may wait for voltage of +5V on the HPD pin to be within a specified range for, e.g., 0.25 second, and then if this is satisfied the AOC assembly may further wait for a voltage drop to 4.2 V>voltage>2.4 V. During this time the AOC assembly may ignore other HPD signaling. If signaling from the source does not indicate compliance with supporting requests for power in excess of nominal power at decision diamond 504, the AOC assembly does not request additional power and operates on nominal power at state 506.

In contrast, if the source indicates compliance (or in embodiments in which source compliance signaling is dispensed with and the AOC assembly simply signals when it requires enhanced power above nominal regardless of whether the source can fulfill the request), the logic moves to diamond 508 to determine if power in excess of nominal is needed by the AOC assembly. If it is, a power request is sent to the source at block 510 in accordance with principles discussed above.

Figure 6:
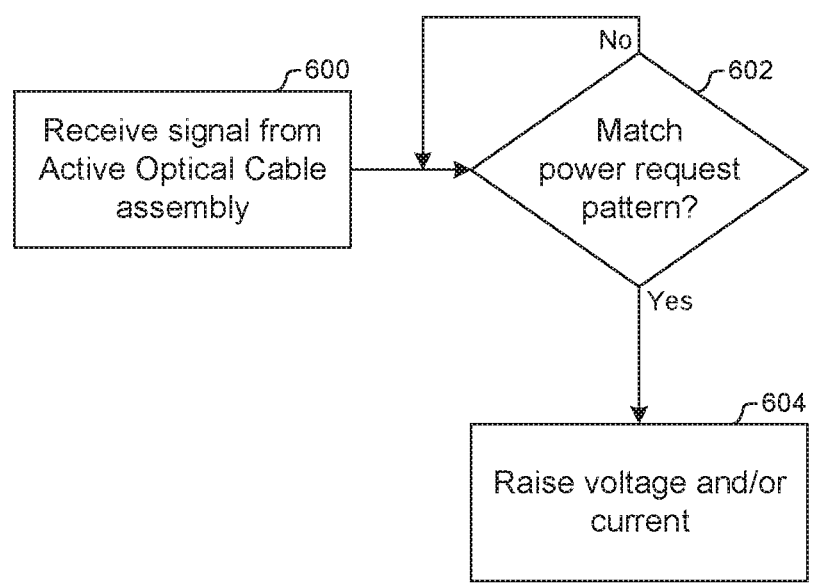

FIG. 6 illustrates logic that may be executed by a source that is able to deliver power in excess of the nominal power to the AOC assembly. The source receives signaling such as that described above from the AOC assembly at block 600. Proceeding to decision diamond 602, the source determines whether the signaling, such as the voltage pattern in the signaling, matches, to within a tolerance, a power request pattern known to the source, e.g., stored in memory of the source for comparison purposes. If a match is found, at block 604 the source complies with the request by raising voltage and/or current to the power level requested by the AOC assembly. In so doing the source, if it can raise power but not to the full requested amount, may deliver as much power as it can to the AOC assembly in excess of the nominal power, albeit perhaps not as much as requested by the AOC assembly.

Figure 7:
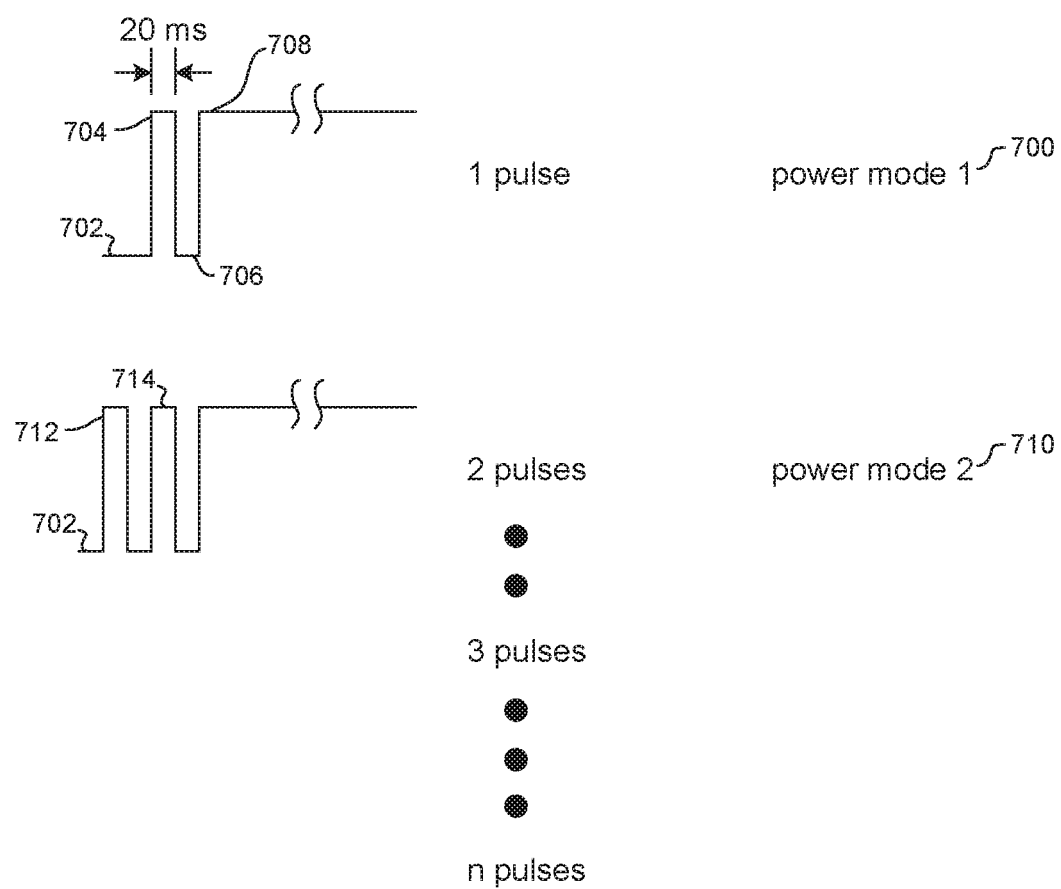
FIG. 7 is a schematic diagram of an alternate signaling scheme that uses one or more narrow pulses of the HPD line to indicate the AOC power mode.

FIG. 7 illustrates an alternate signaling technique that uses one or more narrow pulses of the HPD line to indicate the AOC power mode. In FIG. 7, power mode signaling is accomplished via strobing instead of individual voltage steps. A first power mode 700 may be indicated, for instance, by voltage level on the HPD line 702 being pulsed high (at 704) for a period, e.g., twenty milliseconds, then low (at 706) for the same period, and then high (at 708) again. On the other hand, a second, different power mode 710 may be indicated by multiple such "strobes", e.g., voltage on the HPD line 702 being pulsed twice (at 712, 714) (or more) for the period (e.g., 20 milliseconds). In this way, multiple respective power modes can be signaled by respective different numbers of short, relatively high voltage pulses on the HPD line.

While particular techniques are herein shown and described in detail, it is to be understood that the subject matter which is encompassed by the present application is limited only by the claims.

What is claimed is:

1. An active optical cable (AOC) assembly, comprising:
   at least one electrical-to-optical (EO) converter configured for receiving video signals from a source and converting the video signals to optical signals;
   at least one optical-to-electrical (OE) converter configured to receive the optical signals and convert the optical signals to the video signals to provide the video signals to a sink;
   at least one optical transmission line between the EO converter and OE converter;
   instructions in firmware and/or software to request power for at least one of the converters from the source by changing voltage on a display data channel (DDC) from a first non-zero voltage to a second non-zero voltage; and
   at least one processing circuit configured with the instructions to execute the instructions.

2. The AOC assembly of claim 1, wherein the instructions are executable by processing circuitry in at least one of the converters.

3. The AOC assembly of claim 1, wherein the instructions are executable to request power from the source by changing voltage associated with a hot plug detect (HPD) pin of the DDC.

4. The AOC assembly of claim 1, wherein the instructions are executable to request power from the source by inserting a pattern in the voltage on the DDC.

5. The AOC assembly of claim 4, wherein the pattern comprises at least one voltage step in a signal associated with a hot plug detect (HPD) element of the DDC.

6. The AOC assembly of claim 1, wherein the instructions are executable to request power from the source by raising the voltage on the DDC from zero to a voltage less than the second non-zero voltage for a time period, then at the elapse of the time period increasing the voltage to the second non-zero voltage.

7. The AOC assembly of claim 1, wherein the pattern comprises plural voltage pulses.

8. The AOC assembly of claim 1, wherein the instructions are executable to:
   responsive to signaling from the source not indicating compliance with supporting requests for power in excess of nominal power, not request additional power and operate on nominal power;
   responsive to signaling from the source indicating compliance with supporting requests for power in excess of nominal power and responsive to identifying that power in excess of nominal power is needed, request additional power.

9. An assembly comprising:
   at least a first converter configured for receiving video signals and converting the video signals to optical signals;

at least a second converter configured to receive the optical signals and convert the optical signals to the video signals;

at least one transmission line between the converters; and processing circuitry configured with instructions to request power for at least one of the converters from the source by changing voltage on a display data channel (DDC) from a first non-zero voltage to a second non-zero voltage.

10. The assembly of claim 9, wherein the instructions are executable by at least one of the converters.

11. The AOC assembly of claim 9, wherein the instructions are executable to request power from the source by changing voltage associated with a hot plug detect (HPD) pin of the DDC.

12. The assembly of claim 9, wherein the instructions are executable to request power from the source by inserting a pattern in the voltage on the DDC.

13. The assembly of claim 12, wherein the pattern comprises at least one voltage step in a signal associated with a hot plug detect (HPD) element of the DDC.

14. The assembly of claim 9, wherein the instructions are executable to request power from the source by raising the voltage on the DDC from zero to a voltage less than the second non-zero voltage for a time period, then at the elapse of the time period increasing the voltage to the second non-zero voltage.

15. The assembly of claim 9, wherein the pattern comprises plural voltage pulses.

16. The assembly of claim 9, wherein the instructions are executable to:

responsive to signaling from the source not indicating compliance with supporting requests for power in excess of nominal power, not request additional power and operate on nominal power;

responsive to signaling from the source indicating compliance with supporting requests for power in excess of nominal power and responsive to identifying that power in excess of nominal power is needed, request additional power.

* * * * *